(12) United States Patent
Ikuno

(10) Patent No.: US 11,973,916 B2
(45) Date of Patent: Apr. 30, 2024

(54) IMAGE FORMING SYSTEM, THAT INCLUDES AN IMAGE DISTRIBUTION DEVICE, PRINTING DEVICE, CONTROL METHOD OF PRINTING DEVICE, AND NON-TRANSITORY COMPUTER-READABLE STORAGE MEDIUM

(71) Applicant: CANON KABUSHIKI KAISHA, Tokyo (JP)

(72) Inventor: Takao Ikuno, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/159,917

(22) Filed: Jan. 26, 2023

(65) Prior Publication Data
US 2023/0269342 A1 Aug. 24, 2023

(30) Foreign Application Priority Data
Feb. 24, 2022 (JP) ................................. 2022-026732

(51) Int. Cl.
*H04N 1/60* (2006.01)
*G06F 3/12* (2006.01)

(52) U.S. Cl.
CPC ........... *H04N 1/603* (2013.01); *G06F 3/1208* (2013.01); *G06F 3/1243* (2013.01); *G06F 3/1255* (2013.01); *G06F 3/1285* (2013.01); *H04N 1/6072* (2013.01)

(58) Field of Classification Search
None
See application file for complete search history.

(56) References Cited

U.S. PATENT DOCUMENTS

2015/0371125 A1\* 12/2015 Ishii ...................... G06F 3/1248
358/3.24

FOREIGN PATENT DOCUMENTS

JP 2020175597 A 10/2020

\* cited by examiner

*Primary Examiner* — Lennin R RodriguezGonzalez
(74) *Attorney, Agent, or Firm* — ROSSI, KIMMS & McDOWELL LLP

(57) ABSTRACT

An image forming system according to one aspect of the present disclosure includes an image distribution device and a printing device. The image distribution device distributes print image data, which includes frame image data including an image applied commonly to a plurality of print materials and variable data including information changed on a print material basis, to an external device via a network. The frame image data is configured to enable a setting that a special color setting is required. When the setting indicating that a special color setting is required is made for the frame image data, the printing device uses a color profile associated with the setting to combine the frame image data and the variable data and form the print image.

11 Claims, 12 Drawing Sheets

FIG. 4
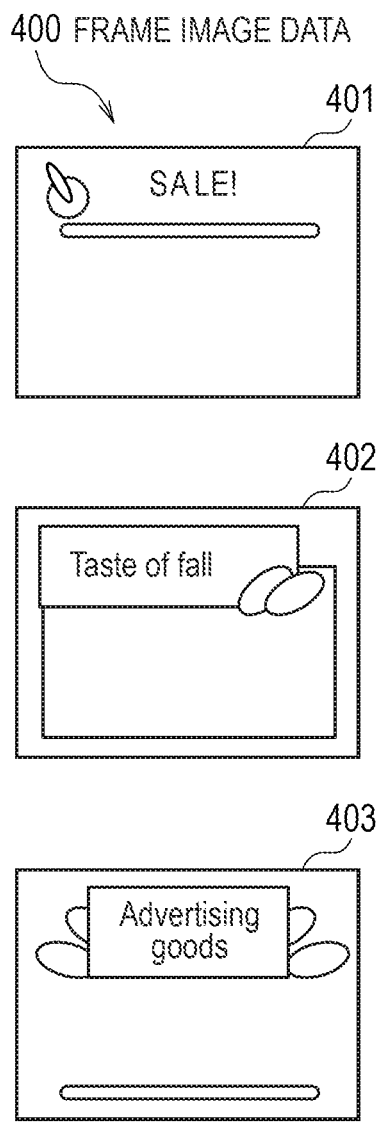
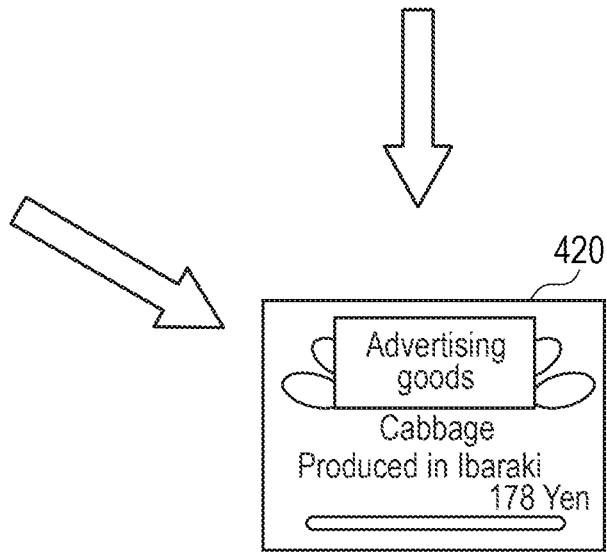

IMAGE FORMING SYSTEM, THAT INCLUDES AN IMAGE DISTRIBUTION DEVICE, PRINTING DEVICE, CONTROL METHOD OF PRINTING DEVICE, AND NON-TRANSITORY COMPUTER-READABLE STORAGE MEDIUM

BACKGROUND OF THE INVENTION

Field of the Invention

The present disclosure relates to an image forming system, a printing device, a control method of a printing device, and a non-transitory computer-readable storage medium.

Description of the Related Art

As a scheme to provide a notification of product description or price at a storefront, a scheme to use a notice such as a point of purchase advertising (POP) is known. Under circumstances where a number of shops are deployed as with a so-called chain store, a system in which data used for printing such a POP is generated on a main store side and distributed to respective shops may be applied.

Further, some notices such as a POP illustrated above as an example may include a notice with a special color such as a corporate color used in a company logo or the like. When a special color is used in a print material in such a way, a color profile may be used in order to correct a shift in hue reproducibility in accordance with a color property for each printer. Use of such a color profile makes it possible to adjust hue reproducibility in each printer and provide print materials having closer hues even when these print materials are printed from separate printers, for example.

Japanese Patent Application Laid-Open No. 2020-175597 discloses a technology for setting a color profile suitable for each job supplied for printing in order to enhance reproducibility of a particular color.

However, when a hue is adjusted so that a color profile is used to reproduce a special color, another color close to the color to be adjusted (for example, another color positioned around the color to be adjusted in the color space) may also be affected by the adjustment. Under such circumstances, the hue of a portion other than the portion where the special color is used may be shifted from the originally intended hue.

SUMMARY OF THE INVENTION

An image forming system according to the present invention is an image forming system including an image distribution device and a printing device, the image distribution device has a distribution unit that distributes print image data to an external device via a network, the print image data including first data applied commonly to a plurality of print materials and second data including information changed on a print material basis, and the printing device has an image forming unit that combines the first data and the second data included in the print image data to form a print image. The first data is configured such that a setting that a special color setting is required is enabled, and when the setting indicating that a special color setting is required is made for the first data, the image forming unit uses a color profile associated with the setting to form the print image based on the first data and the second data.

Further features of the present invention will become apparent from the following description of exemplary embodiments with reference to the attached drawings.

BRIEF DESCRIPTION OF THE DRAWINGS

FIG. 4 is a diagram illustrating an example of print image data.

DESCRIPTION OF THE EMBODIMENTS

Figure 1:
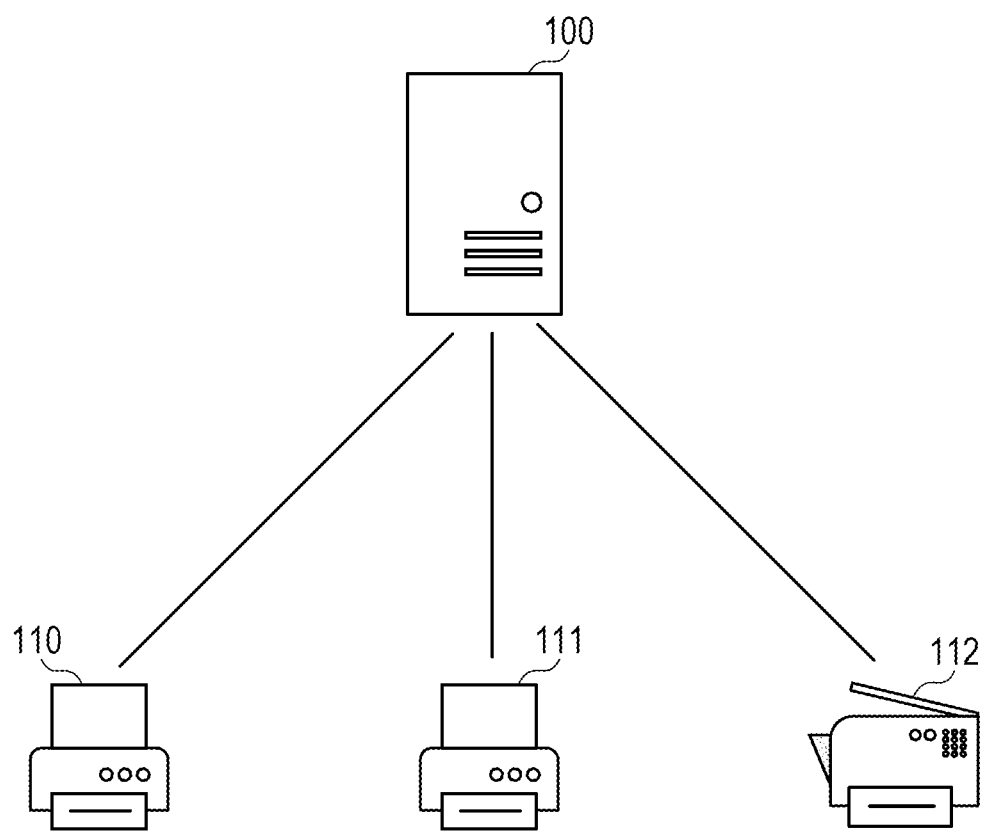
FIG. 1 is a diagram illustrating an example of a system configuration of an image forming system.

Preferred embodiments of the present disclosure will be described below in detail with reference to the drawings.

Note that, throughout the present specification and the drawings, components having substantially the same functional configuration are labeled with the same reference, and duplicated description thereof will be omitted.

Introduction

As a scheme to provide a notification of product description or price at a storefront, a scheme to use a notice such as a POP is known. In creating such POP data for product description, it is not necessarily effective to create POP data in each shop under the circumstances where a number of shops are deployed as with a so-called chain store, because individual shops may create similar data. In view of such a background, for example, a system in which POP data used respectively in a series of shops are collectively created on a head office side of the chain store and distributed to respective shops (hereafter, also referred to as a print data distribution system) may be applied. Under the circumstances where such a print data distribution system is applied, POP data is regularly updated on the head office side, and the shops access a server on the head office side via a terminal device such as a PC to acquire the POP data, for example. This enables the shop to use the acquired POP data and cause a printing device installed in the shop to print a POP that will be placed at the storefront.

On the other hand, some print materials such as a POP presented at a shop may have a company logo printed thereon. Some company logos as discussed above use a so-called corporate color, and in such a corporate color, a hue or hues that impress inside and outside the company are specified for each company. When a logo using such a corporate color is printed, hue reproducibility may be shifted due to a color property of a printer. Because of the nature of a corporate color that is a color representing a company, occurrence of such a hue shift is generally considered undesirable.

In view of such a background, when a special color such as a corporate color is used for printing, a color profile may be used to perform adjustment of hue reproducibility.

A color profile is data for adjusting hue reproducibility, which is data for correcting a color designated by input image data so that the designated color is printed in a specific color when the image data is rendered.

Even for the same color designated in image data, hues output by respective printing devices may slightly differ. Thus, a color profile for printing a corporate color is prepared for each printing device in order to exactly adjust colors as in a case of a corporate color, and an operator registers the color profile to a printing device. By using a color profile for a corporate color registered in the printing device, the user is able to obtain output of the same color even when any printing device is used for the output.

Some special color such as a corporate color may use such a hue that would not be output by typical printing. When a color profile adjusted for outputting a corporate color is used, hue reproducibility is adjusted so that some colors (for example, colors close to the special color) become closer to the special color, for example. In such a case, other colors close to the color to be adjusted (for example, other colors positioned around the color to be adjusted in the color space) may also be affected by the adjustment. As a more specific example, when the corporate color is a green-based color, a particular green color is targeted and subjected to adjustment to shift the hue thereof to be closer to the corporate color, and this adjustment may also be applied to colors around the particular green color. In such circumstances, for example, as with a portion of a green color close to a natural color in a photograph image, a portion to which the hue reproducibility adjustment is not supposed to be applied may also be affected by the adjustment for shifting the hue to be closer to the corporate color.

In particular, under circumstances where color profiles are applied on a job basis, a color profile will be applied in the same manner even when pages in which a corporate color is used and pages in which the corporate color is not used are mixed in a series of pages in a job. Thus, in such a case, pages in which it is undesirable to apply hue reproducibility adjustment intended for a case where the corporate color is used will also be subjected to application of the same adjustment.

In view of the above circumstances, the present disclosure proposes a technology that can apply a color profile in a more suitable manner in accordance with a property of a print image to be printed (for example, in accordance with whether or not a special color is included or the like).

System Configuration

An example of a system configuration of an image forming system according to one embodiment of the present disclosure will be described with reference to FIG. 1. The image forming system according to the present embodiment includes an image distribution device 100 and a plurality of printing devices. Note that, in the example illustrated in FIG. 1, printing devices 110, 111, and 112 are provided as the plurality of printing devices. The image distribution device 100 and each of the printing devices 110, 111, and 112 are connected together so as to be able to transmit and receive information to and from each other via a predetermined network.

Note that the type of the network is not particularly limited as long as the image distribution device 100 and each of the printing devices 110, 111, and 112 can be connected so as to be able to transmit and receive information to and from each other. As a specific example, the image distribution device 100 and each of the printing devices 110, 111, and 112 may be connected via a wired or wireless local area network (LAN). Further, as another example, the image distribution device 100 and each of the printing devices 110, 111, and 112 may be connected via a wide area network (WAN) or the Internet.

The image distribution device 100 manages data configuring print image (hereafter, also referred to as print image data) and information about various settings when printing the print image (hereafter, also referred to as setting information) and distributes the data and the information to another device via the network.

The image distribution device 100 according to the present embodiment manages, as print image data, frame image data applied commonly to a plurality of print materials and variable data that is information changed for each print material. The frame image data may be, for example, data corresponding to a template portion such as a frame in a print material such as a POP. Further, the variable data is data including information corresponding to a portion replaced for each print material such as a product name or a price in a print material such as a POP. Further, the image distribution device 100 according to the present embodiment manages setting information in which a combination of frame image data and variable data related to formation of a print image is indicated as the above setting information. This setting information is associated with targeted frame image data and variable data and distributed to external devices (for example, the printing devices 110, 111, and 112 or the like).

Note that the frame image data corresponds to an example of "first data", and the variable data corresponds to an example of "second data".

Each of the printing devices 110, 111, and 112 acquires print image data from the image distribution device 100, forms a print image based on the print image data, and then prints the print image on a recording medium such as a sheet. Note that, in the following description, although the printing device 110 is focused on for various description, the same may also apply to the printing devices 111 and 112.

The printing device 110 according to the present embodiment acquires frame image data and variable data as the print image data and acquires setting information in which a combination of the frame image data and the variable data is indicated as setting information corresponding to the print image data. In such a case, based on the setting information described above, the printing device 110 forms a print image by combining the above frame image data and the above variable data, prints the print image on a recording medium, and then discharges a print material in accordance with a print result to a predetermined output target.

The image forming system described with reference to FIG. 1 can be applied to a use case where POP data is created on a shop basis under a circumstance where a number of shops are deployed, such as a chain store, for example. In such a case, for example, an expected usage form may be such that the image distribution device 100 is installed on the head office side, each of the printing devices 110, 111, and 112 is installed in each shop, and a POP is then printed for each shop based on print image data created on the head office side.

Configuration Example of Image Distribution Device

As for an example of the configuration of the image distribution device 100, a case where print image data is formed of frame image data and variable data will be focused on and described with reference to FIG. 2. Note that the data configuration of the print image data will be described separately later in detail with reference to FIG. 4.

The image distribution device 100 includes a frame data registration unit 201, a variable data registration unit 202, a delivery data creation unit 203, a data transmission request receiving unit 204, and an image data transmission unit 205.

The frame data registration unit 201 accepts registration of frame image data to be applied commonly to a plurality of print materials, such as an overall design image of a print image (in other words, a template image) and holds the frame image data.

The variable data registration unit 202 accepts registration of information replaced for each print material, such as a name or a price of a product, a comment, or the like and holds the information as variable data.

The delivery data creation unit 203 constructs a combination of frame image data and variable data used for printing the print material in accordance with a requested print material and generates print image data based on the frame image data and the variable data in accordance with the combination. As a specific example, print materials are requested in external devices (for example, the printing devices 110, 111, and 112 or the like) that are candidates of a delivery target of print image data, and the delivery data creation unit 203 may generate print image data used for printing the print material separately on an external device basis.

The data transmission request receiving unit 204 receives a transmission request for print image data from an external device (for example, the printing devices 110, 111, and 112 or the like) and instructs the image data transmission unit 205 to transmit print image data in accordance with the request.

The image data transmission unit 205 instructs the delivery data creation unit 203 to create print image data requested from an external device in accordance with an instruction from the data transmission request receiving unit 204 and acquires the created print image data from the delivery data creation unit 203. The image data transmission unit 205 then transmits the acquired print image data to the requesting external device.

Figure 2:
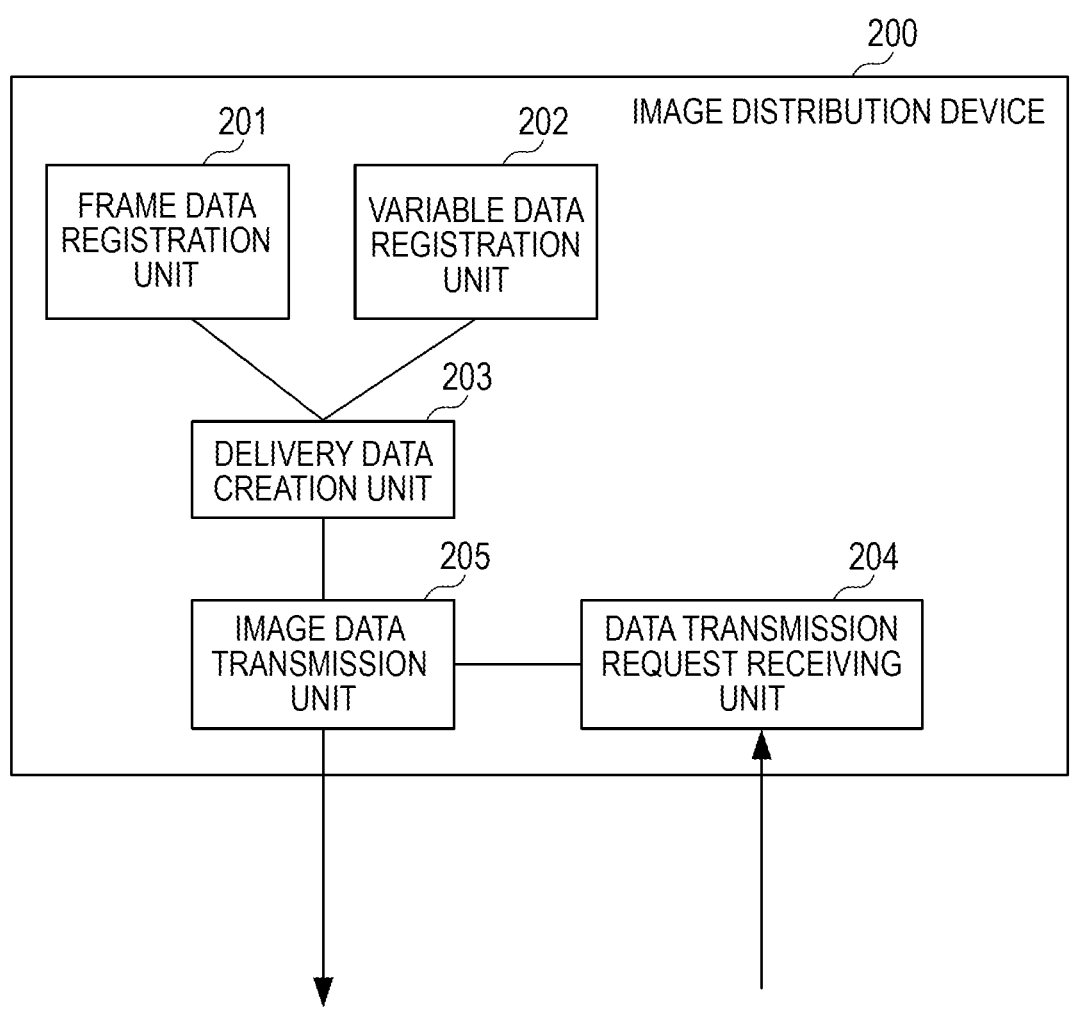
FIG. 2 is a diagram illustrating an example of a configuration of an image distribution device.

Note that the configuration illustrated in FIG. 2 is only an example and is not intended to limit the configuration of the image distribution device 100 according to the present embodiment. For example, some component may be added as appropriate in accordance with the function of the image distribution device 100. Further, the configuration illustrated in FIG. 2 may be implemented with cooperation of a plurality of devices. As a specific example, some of the components illustrated in FIG. 2 may be mounted outside the image distribution device 100. Further, as another example, the processing load of at least some of the series of components illustrated in FIG. 2 may be distributed over a plurality of devices.

Configuration Example of Printing Device

An example of the configuration of a printing device 300 that is applicable as the printing devices 110, 111, and 112 will be described with reference to FIG. 3.

The printing device 300 includes a central processing unit (CPU) 301, an embedded multi-media card (eMMC) 302, and a dynamic random access memory (DRAM) 303. Further, the printing device 300 includes a storage device 304, an operation unit 305, a recording unit 306, an image processing unit 307, and a communication unit 308. Respective components of the printing device 300 described above are connected so as to be able to transfer information with each other via a data bus 309.

The CPU 301 corresponds to a control unit of the printing device 300 and controls the overall operation of the device.

The eMMC 302 is a storage area of the CPU 301 for storing a control unit program or the like. The eMMC 302 may be implemented by using a storage device such as a flash memory, for example.

The DRAM 303 is a storage area used for storing program control variables or the like. The DRAM 303 may be implemented by using a volatile memory that can temporarily hold image data or the like processed by the CPU 301, for example. Further, the DRAM 303 may be used as a main storage memory of the CPU 301. That is, the DRAM 303 may be used as a work area or a temporary storage area into which various programs are loaded.

The storage device 304 is a storage area that stores various data such as image data. The storage device 304 may be implemented by using a nonvolatile storage device such as a hard disk drive (HDD), for example. For example, various data used for printing (for example, print image data or the like) are stored in the storage device 304.

The operation unit 305 is a user interface for presenting various information to the user or accepting various instructions from the user. For example, the operation unit 305 may be implemented by using a display used for presenting information to the user or a touch panel, a button, a switch, or the like used for accepting an instruction from the user.

The recording unit 306 is a device for printing a print image rendered based on image data on a recording medium such as a sheet. As a specific example, the recording unit 306 places toner on a recording medium, presses the toner and the recording medium by a heated fixer, and thereby fixes the toner to the recording medium.

The image processing unit 307 performs image data synthesis, print image rendering based on the image data, a coding process or a decoding process on binary data of the rendered print image, and the like.

The communication unit 308 is a communication interface used for the printing device 300 to access a network and transmit and receive data to and from an external device. The configuration applied as the communication unit 308 may be changed as appropriate in accordance with a type of the network or an applied communication scheme.

Figure 3:
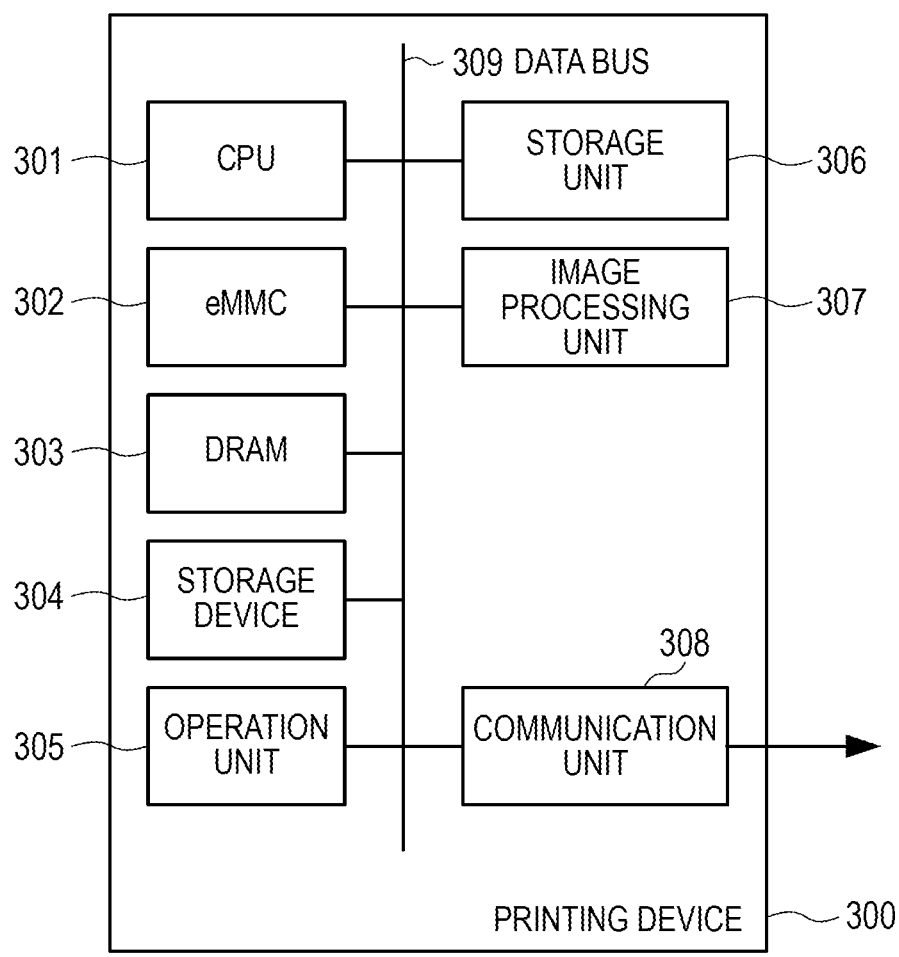
FIG. 3 is a diagram illustrating an example of a configuration of a printing device.

Note that the configuration illustrated in FIG. 3 is only an example and is not intended to limit the configuration of the printing device 300 according to the present embodiment. For example, some component may be added as appropriate in accordance with the function of the printing device 300. Further, the configuration illustrated in FIG. 3 may be implemented with cooperation of a plurality of devices. As a specific example, some of the components illustrated in FIG. 3 may be mounted outside the printing device 300. Further, as another example, the processing load of at least some of the series of components illustrated in FIG. 3 may be distributed over a plurality of devices.

Print Image Data

An example of print image data accepted for registration and held by the image distribution device 100 will be described with reference to FIG. 4. The print image data illustrated in FIG. 4 is formed of frame image data 400 and variable data 410.

The frame image data 400 is data including an image applied commonly to a plurality of print materials as described above and corresponds to a portion of a template representing a general frame design of a print image, such as a frame in a print material such as a POP, for example. For example, each of references 401, 402, and 403 schematically illustrates a candidate of data to be used as the frame image data 400.

The variable data 410 is data on information to be replaced for each print material as described above and corresponds to data such as a product name, a price, a comment, or the like used for a POP, for example. The reference 411 schematically illustrates candidates of data to be used as the variable data 410.

Specifically, the variable data 411 is formed of text data indicating a name, a price, a comment, and the like of vegetables that are products.

The frame image data 400 and the variable data 410 are combined to form a print image to be used in printing. For example, the reference 420 illustrates a POP image used in printing of a POP as an example of a print image formed by the frame image data 400 and the variable data 410.

For example, a print image is combined and rendered based on the frame image data 400 and the variable data 410 by the printing device 300 described above, this print image is printed on a recording medium such as a sheet, and thereby a print material (for example, a POP) is created.

Color Profile

Next, a color profile will be described.

A color profile refers to data used for adjustment of a hue in image rendering performed by a printing device. As a specific example, a color profile is used for changing impression of the color of a print material. Further, as another example, a color profile is used for adjustment of a hue shift between a plurality of models so that respective hues of print materials created by the plurality of models become closer hues (ideally, become the same hue). In general, as a color profile, a form of the International Color Consortium (ICC) profile or the like is used.

As a color profile used in a printing device, the CMYK color profile is used for example. The CMYK color profile is used when image data expressed in the RGB colorimetric system used for electronically displaying an image is converted into rendering data used for rendering of a print image expressed in the CMYK colorimetric system. In conversion into rendered data expressed in the CMYK colorimetric system, use of the CMYK color profile causes hue conversion to take place. In this hue conversion, the print characteristics of a printing device is taken into consideration, and the hue that would be printed in the CMYK colorimetric system is adjusted to fit to an instructed hue.

Next, an application example of a color profile when a special color such as a corporate color is printed will be described. As described above, a corporate color may be used in a company logo. The hue of a corporate color is specified for each company, and a hue that is not output by typical printing may be used. It is desirable for a company logo or the like to be printed in a specified color, and if printing devices used for output produce different hues, this will be problematic. Accordingly, it may be desirable to perform printing by using a dedicated color profile, which differs from a normal color profile, so that no difference occurs between the hues produced by respective printing devices.

The color profile represents expression of colors in general. Thus, for example, by using a common color profile among a plurality of models, it is possible to match the hues of print materials among the plurality of models. However, under the circumstance where a color profile is used for reproducing a special color such as a corporate color, the requirement for adjustment of color reproducibility tends to be stringent, and as a result, stricter color adjustment is often required for respective models. Under such circumstances, for the color profile used for reproduction of a special color such as a corporate color, it is difficult to develop the same color profile over multiple models, and in such a case, color profiles will be adjusted separately for respective models.

Process

An example of the process of the image forming system according to the present embodiment will be described.

First, as for an example of the overall process flow in the image forming system according to the present embodiment, a process related to printing when a corporate color is used for a print material will be focused on and described with reference to FIG. 5.

Figure 6:
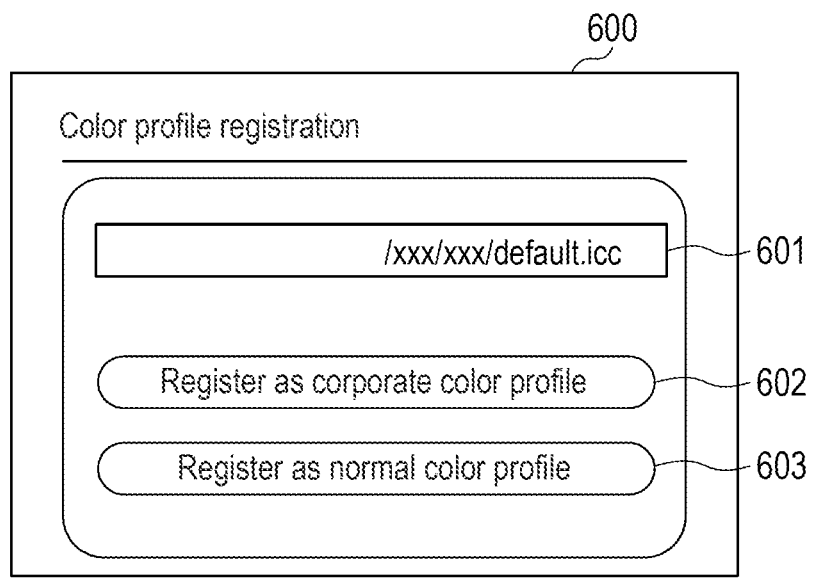
FIG. 6 is a diagram illustrating an example of an operation window of the printing device.

In S500, the printing device 110 registers a color profile used in a normal printing and a color profile associated with a corporate color (in other words, a color profile associated with a special color) in accordance with an instruction from the user. As a specific example, the CPU 301 of the printing device 110 may cause a window 600 as illustrated in FIG. 6 as an example to be displayed on the operation unit 305 and thereby accept an instruction related to registration of a color profile illustrated as an example above from the user via the window 600. Note that the window 600 will be described separately later in detail.

In S501, the image distribution device 100 registers the variable data 410 used for generation of a print image to be distributed to each printing device (for example, the printing device 110).

In S502, the image distribution device 100 registers the frame image data 400 used for generation of a print image to be distributed to each printing device.

Note that the registration of variable data in S501 or the registration of the frame image data 400 in S502 may be performed in accordance with an instruction from an administrator or the like (for example, an instruction accepted via a predetermined user interface), for example.

In S503, the image distribution device 100 registers information indicating whether or not a corporate color is used (in other words, information indicating whether or not a special color setting is required) for the frame image data 400 registered in S502. For example, when having recognized that a company logo is included in the frame image data 400 based on an instruction from the user, the image distribution device 100 may set information indicating that a corporate color is used for this frame image data 400. Note that the information indicating that a corporate color is used corresponds to an example of "color adjustment information". Further, for example, by being attached to frame image data as attached information, the color adjustment information can be transmitted to an external device in association with the frame image data. Note that, although the user who registers frame image data manually sets the information indicating whether or not a corporate color is used in the present embodiment, an image may be registered in advance, and when the same image data as the registered image is included in the registered frame image data, the image distribution device may automatically set the information indicating that a corporate color is used, for example.

In S504, the image distribution device 100 sets a combination of the frame image data 400 and the variable data 410 for generating a print image (for example, a print image of a print material used in a shop where the printing device is installed) to be distributed to each printing device.

As set forth, preparation of distribution of print image data is completed on the image distribution device 100 side.

In S505, the printing device 110 transmits a transmission request for print image data to the image distribution device 100.

In S506, in response to the transmission request for print image data from the printing device 110 in S505, the image distribution device 100 transmits print image data to generate a print image used for printing in the printing device 110.

In S507, the printing device 110 changes the color profile to use for each page to be printed based on the information that indicates whether or not a corporate color is used and that is set in the frame image data included in the print image data received in S506. As a specific example, based on the color adjustment information attached to frame image data, the printing device 110 may recognize whether or not a corporate color is used in the frame image data. The process of S507 is performed by the image processing unit 307 in rendering a print image, for example.

In S508, the printing device 110 renders a print image based on the combination of the frame image data 400 and the variable data 410 included in the print image data received in S506.

In S509, the printing device 110 prints a print image rendered in S508 on a recording medium such as a sheet.

Next, some processes of a series of processes illustrated in FIG. 5 will be described in more detail.

First, an example of a window used for accepting an instruction from the user by the printing device 110 when performing the process of S500 will be described with reference to FIG. 6. The window 600 includes an entry region 601 and registration buttons 602 and 603.

The entry region 601 is an entry region for accepting designation of a color profile to be registered from the user. In the example illustrated in FIG. 6, when a path indicating the storage location of a file is input to the entry region 601, the file indicated by the path is designated as a color profile to be registered. Note that, in such a case, a path indicating the storage location on a network may be designated as the path. This also makes it possible to designate a color profile managed on the network or a color profile managed in an external device.

The registration button 602 is a button for accepting an instruction related to registration from the user when a color profile designated via the entry region 601 is registered as a color profile associated with a corporate color.

The registration button 603 is a button for accepting an instruction related to registration from the user when a color profile designated via the entry region 601 is registered as a normal color profile.

Next, an example of a window used for accepting an instruction from the user by the image distribution device 100 when performing the process of S501 to S504 will be described with reference to FIG. 7.

First, a window 700 will be described. The window 700 is a window for accepting various instructions related to registration of frame image data from the user. The window 700 includes an entry region 701, a display region 702, a switching button 703, an entry region 704, and a registration button 705.

The entry region 701 is an entry region for accepting, from the user, designation of frame image data to be registered. In the example illustrated in FIG. 7, when a path indicating the storage location of a file is input to the entry region 701, the file indicated by the path is designated as frame image data to be registered. Note that, in such a case, a path indicating the storage location on a network may be designated as the path. This also makes it possible to designate frame image data managed on the network or frame image data managed in an external device.

The display region 702 is a display region in which preview of an image (for example, a template image) based on frame image data designated via the entry region 701 is displayed.

The switching button 703 is a button for accepting designation from the user as to whether or not a corporate mark is present in the image data (in other words, whether or not a corporate color is used) for the frame image data designated via the entry region 701. The process of accepting an instruction via the switching button 703 corresponds to the process of S503 illustrated in FIG. 5.

The entry region 704 is an entry region for accepting, from the user, designation of an ID used for identifying the data attached to frame image data designated via the entry region 701.

The registration button 705 is a button for accepting, from the user, an instruction related to registration of frame image data based on information designated via the window 700.

Figure 7:
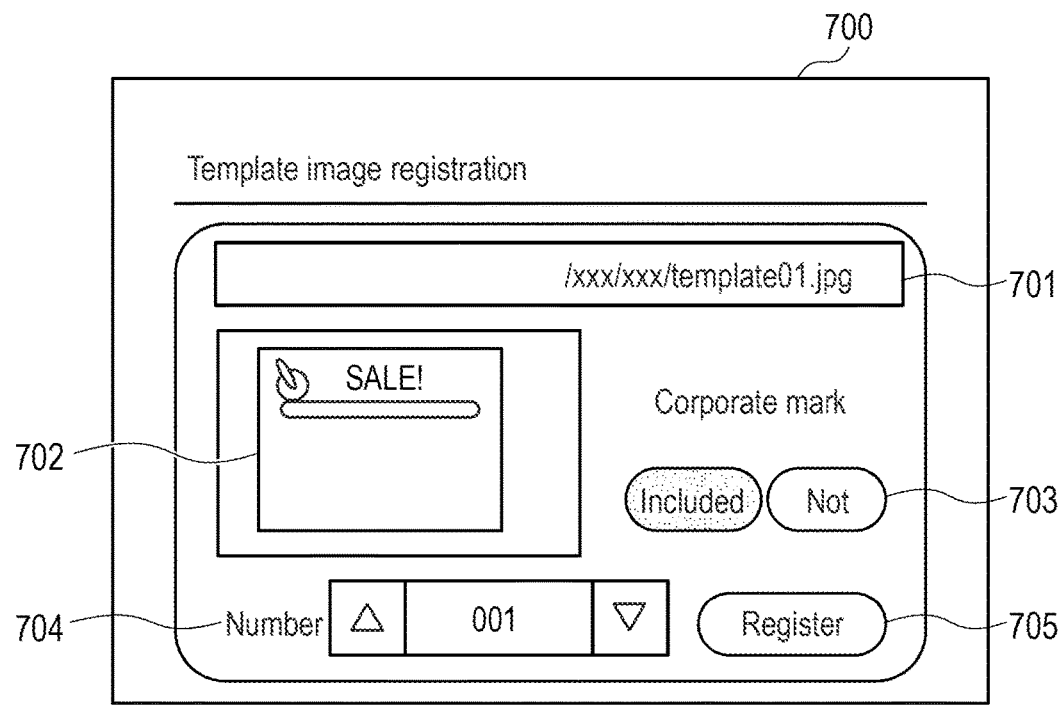
FIG. 7 is a diagram illustrating an example of an operation window of the image distribution device.

Note that the button 703 of FIG. 7 is used for setting whether or not a corporate mark is included. Names of a plurality of color profiles may be registered in advance in the image distribution device, and a name of a color profile used in printing may be set from the registered names. This enables printing that uses a color profile that the user intends to use as appropriate even when there are three or more types of profiles that the user intends to use.

Next, a window 710 will be described. The window 710 is a window for accepting various instruction related to registration of variable data from the user. The window 710 includes an entry region 711 and an entry region 712.

The entry region 712 is an entry region for accepting, from the user, an instruction related to registration of information to be printed separately on a print material basis. In the example illustrated in FIG. 7, the entry region 712 is configured such that information such as a product name, a price, a comment, and the like for each product can be registered therein as text data. Further, information that has already been registered is displayed in the entry region 712.

Further, the example illustrated in FIG. 7 is configured such that variable data can be registered for each shop to which print image data is to be distributed. A shop to which variable data is to be registered is designated via the entry region 711. That is, a targeted shop is designated via the entry region 711, and this causes switching of the shop to which variable data where information is registered via the entry region 712 is registered.

Further, the entry region 712 can be used for designating an ID (template number) of frame image data applied on a print material basis. Accordingly, a combination of information (variable data) for each print material for which information is input to the entry region 712 and frame image data registered via the window 700 can be set. Further, in accordance with the above designation, a combination of the frame image data 400 and the variable data 410 for generating a print image distributed to each printing device is set as illustrated as the process of S504 in FIG. 5.

Figure 8:
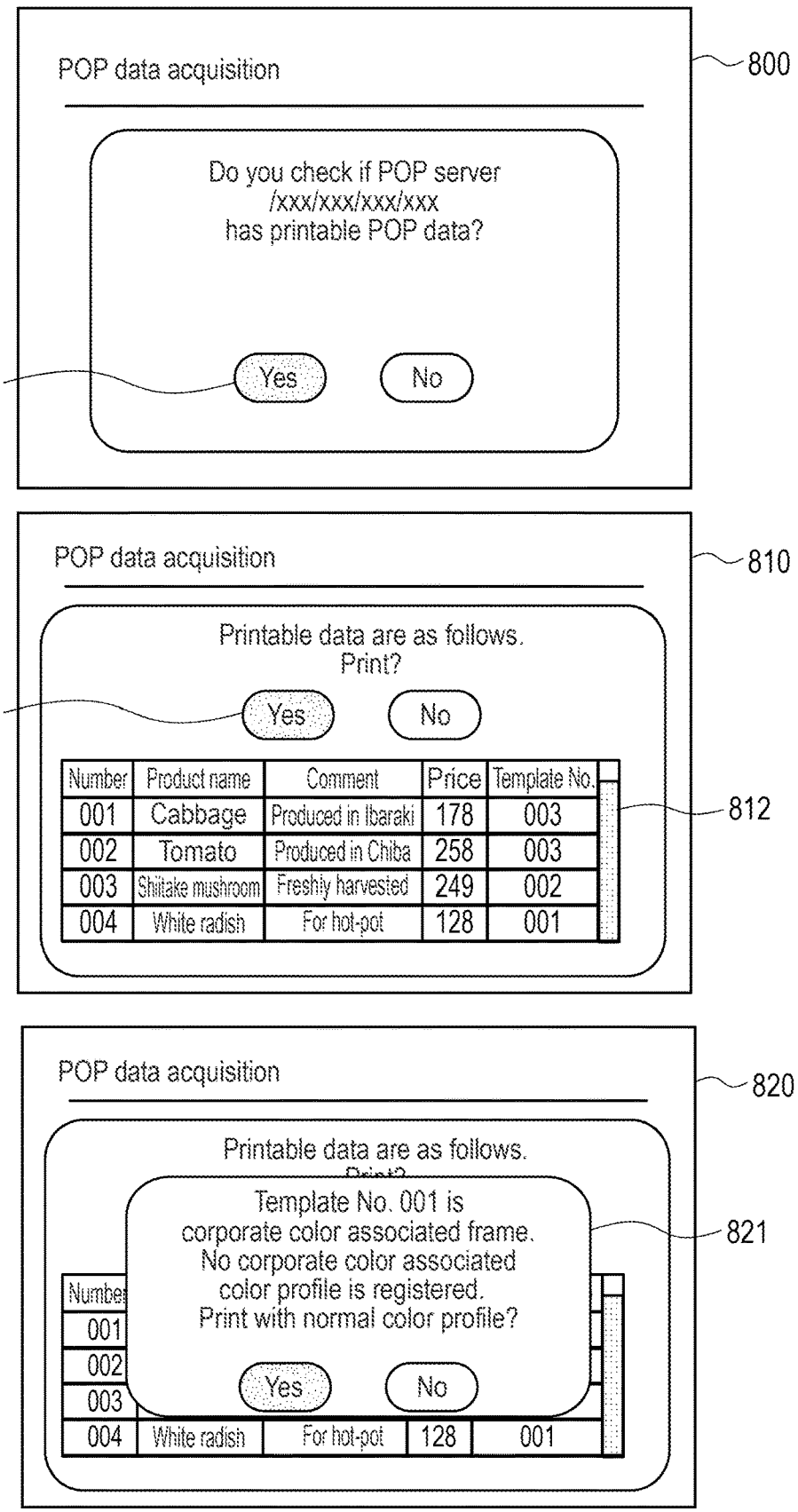
FIG. 8 is a diagram illustrating an example of an operation window of the printing device.

Next, an example of a window used for accepting an instruction from the user by the printing device 110 in performing the process of S505 to S509 illustrated in FIG. 5 will be described with reference to FIG. 8. Each of windows 800, 810, and 820 illustrated in FIG. 8 is presented to the user via the operation unit 305, for example.

Figure 5:
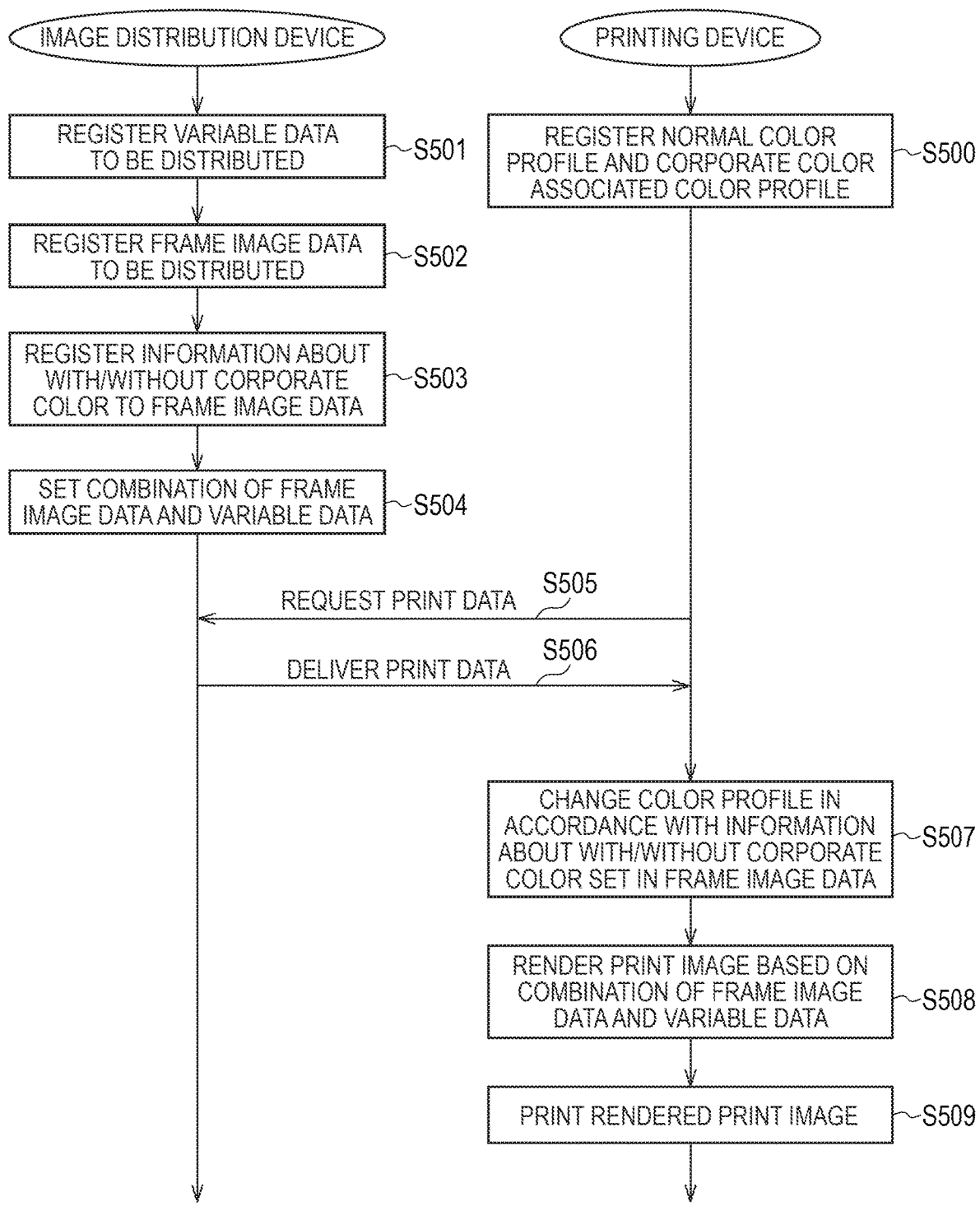
FIG. 5 is a sequence diagram illustrating an example of a process in the image forming system.

First, the printing device 110 presents a window 800 to a user in the process of S505 illustrated in FIG. 5 and accepts, from the user, an instruction related to acquisition of print image data via the window 800. In response to detecting pressing of a button 801, the printing device 110 requests the image distribution device 100 for transmission of print image data.

In response to receiving the transmission request for print image data from the printing device 110, the image distribution device 100 transmits print image data associated with the transmission request back to the printing device 110. In response to receiving print image data from the image distribution device 100, the printing device 110 presents information about the print image data received via the operation unit 305 (for example, a list of information about each of a series of print materials printed by the print image data) to the user. The window 810 illustrates an example of a window used for presenting, to the user, information about print image data received from the image distribution device 100 by the printing device 110. A display region 812 is a display region in which information about the print image data received by the printing device 110 is displayed. Further, in response to the button 811 being pressed, printing based on the above print image data is started.

In forming a print image, the printing device 110 switches a color profile to be applied in accordance with frame image data used for forming the print image. For example, when information indicating that a corporate color is used has been set for targeted frame image data, a color profile associated with the corporate color will be used. In contrast, if the associated color profile is not registered in the process of S500 illustrated in FIG. 5, this may cause a case where printing is not performed with an expected hue. In such a case, the printing device 110 issues, to the user (who provides a print instruction), alert information (for example, a warning) indicating that the expected hue may not be obtained. The window 820 illustrates an example of a window related to an alert of information to the user. Specifically, in the window 820, a dialog box 821 displaying a warning message is displayed to present the warning message to the user.

Next, as for an example of the process in the printing device 110, the process illustrated as S507 to S509 in FIG. 5 in particular will be focused on and described with reference to FIG. 9. In the example illustrated in FIG. 9, as illustrated with reference to FIG. 5, information indicating whether or not a corporate color is used is set for frame image data by the image distribution device 100, and the printing device 110 references this information to switch the process related to formation of a print image. Further, in the example illustrated in FIG. 9, information indicating whether or not a corporate color is used has been set in advance for each frame image based on the operation performed via the window 700 illustrated in FIG. 7. Further, a series of processes illustrated in FIG. 9 are implemented when the CPU 301 loads a program stored in the eMMC 302 or the storage device 304 into the DRAM 303 and executes the program, for example.

In S900, the printing device 110 queries the image distribution device 100 as to whether or not printable print image data is present and presents a result of this inquiry to the user (operator). This enables the user to know whether or not printable print image data is present.

In S901, the printing device 110 switches the subsequent operation in accordance with whether or not printable print image data is present.

Figure 9:
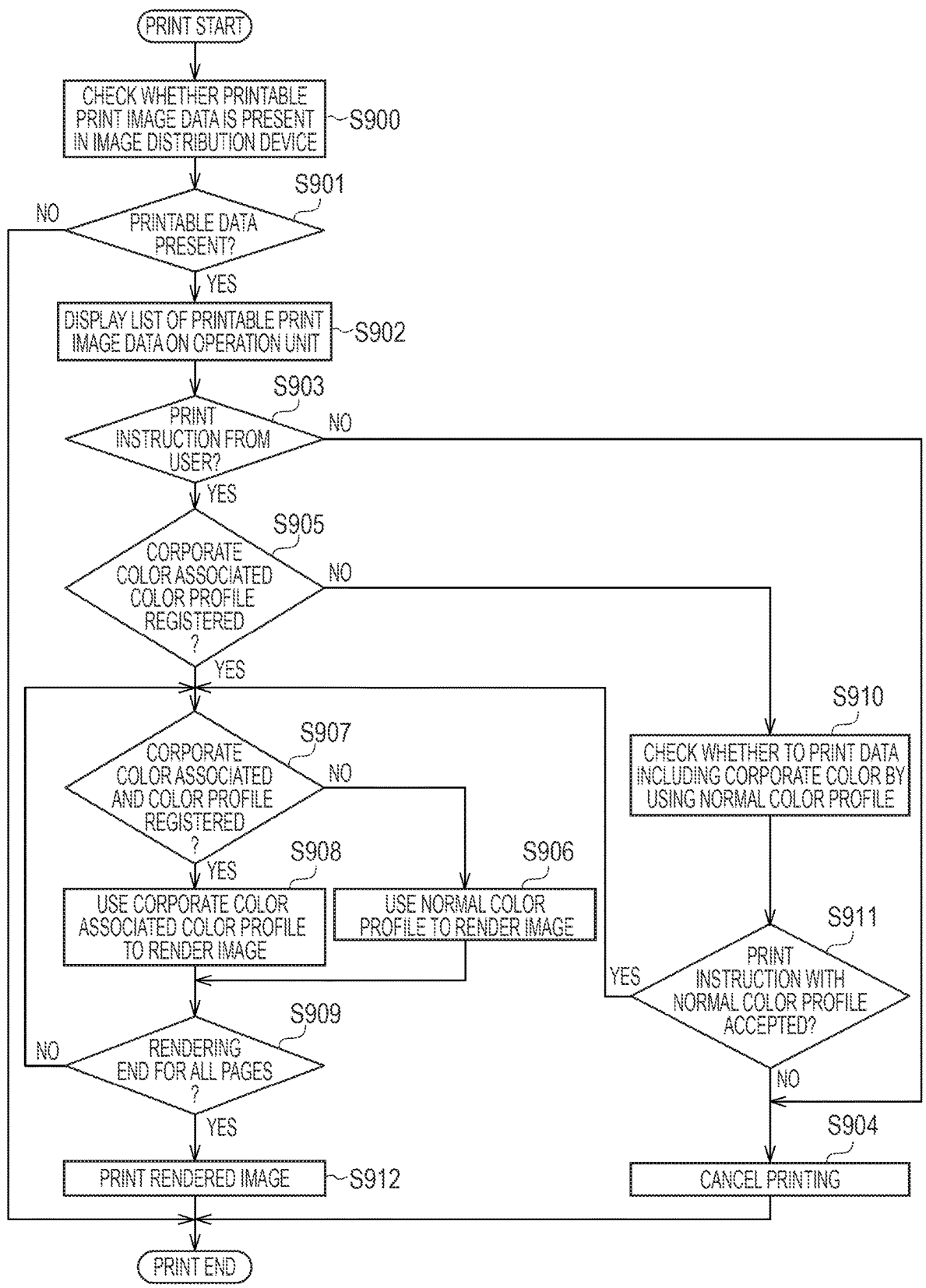
FIG. 9 is a flowchart illustrating an example of a process in the printing device.

If the printing device 110 determines in S901 that no printable print image data is present, the printing device 110 ends the series of processes illustrated in FIG. 9.

In contrast, if the printing device 110 determines in S901 that printable print image data is present, the printing device 110 proceeds with the process to S902.

In S902, the printing device 110 receives printable print image data from the image distribution device 100 and causes the window 810 displaying a list of print image data (in other words, a list of printable print materials) to be displayed on the operation unit 305.

The printing device 110 then waits for an instruction of printing from the user (operator) in S903. In S903, the instruction accepting from the user refers to an instruction to select product information to be printed and an instruction to start printing.

If the printing device 110 determines in S903 that no instruction of printing is accepted from the user (for example, when termination is instructed without an instruction of printing being accepted or the like), the printing device 110 proceeds with the process to S904. In such a case, the printing device 110 stops the process for printing in S904 and ends the series of processes illustrated in FIG. 9.

In contrast, if the printing device 110 determines in S903 that an instruction of printing is accepted from the user, the printing device 110 proceeds with the process to S905.

In S905, the printing device 110 determines whether or not a color profile for printing a corporate color is registered in the printing device 110.

If the printing device 110 determines in S905 that no color profile associated with a corporate color used in the frame image data is registered, the printing device 110 proceeds with the process to S910.

In contrast, if the printing device 110 determines in S905 that a color profile associated with a corporate color used in the frame image data is registered, the printing device 110 proceeds with the process to S907.

In S910, the printing device 110 queries the user as to whether or not to apply the normal color profile to print a print image using the frame image data in which a corporate color is used. As a specific example, the printing device 110 may cause the dialog box 821 illustrated as an example in the description for the window 820 to be displayed on the operation unit 305 and thereby perform the above inquiry to the user via the dialog box 821.

In S911, the printing device 110 determines whether or not an instruction of printing applying the normal color profile has been accepted for the print image using the frame image data in which the corporate color is used.

If the printing device 110 determines in S911 that the printing applying the normal color profile is not instructed for the print image using the frame image data in which the corporate color is used, the printing device 110 proceeds with the process to S904. In such a case, the printing device 110 stops the process for printing in S904 and ends the series of processes illustrated in FIG. 9.

In contrast, if the printing device 110 determines in S911 that the printing applying the normal color profile is instructed from the user for the print image using the frame image data in which the corporate color is used, the printing device 110 proceeds with the process to S907.

Note that, in the present embodiment, if a color profile for printing a corporate color is not registered in the printing device 110, the printing device 110 queries the user as to whether or not to perform printing without using the corporate color regardless of the content of frame image data to be printed. If "NO" is determined in S905, it may be determined whether or not frame image data using the corporate color is included in the frame image data to be printed. If the frame image data using the corporate color is included, the printing device 110 performs the process illustrated with S910. In contrast, if no frame image data including the corporate color is present, the printing device 110 proceeds with the process to S906 without performing S910, S911, and S907.

In S907, based on the print image data received in S902, the printing device 110 determines whether or not a corporate color is used in frame image data to be applied for each page to be printed and an associated color profile has been registered. For S907 to S909, the process is performed for each page to be printed.

If the printing device 110 determines in S907 that a corporate color is used in frame image data to be applied for the targeted page and that an associated color profile has been registered, the printing device 110 proceeds with the process to S908. In S908, the printing device 110 uses a color profile associated with a corporate color used in the frame image data to render a print image of a targeted page.

In contrast, If the printing device 110 determines in S907 that a corporate color is not used in frame image data to be applied for the targeted page or an associated color profile has not been registered, the printing device 110 proceeds with the process to S906. In S906, the printing device 110 uses the normal color profile to render a print image of a targeted page.

In S909, the printing device 110 determines whether or not rendering of the print image is completed for all the pages to be printed.

If the printing device 110 determines in S909 that the rendering of the print image is not completed for all the pages to be printed, the printing device 110 proceeds with the process to S907. In such a case, the process on and after S907 is again performed on a page where the rendering of the print image is not completed.

Then, if printing device 110 determines in S909 that the rendering of the print image is completed for all the pages to be printed, the printing device 110 proceeds with the process to S912. In S912, the printing device 110 prints the rendered print image on a recording medium such as a sheet. In response to the completion of printing for all the pages to be printed, the printing device 110 then ends the series of processes illustrated in FIG. 9.

MODIFIED EXAMPLES

Next, modified examples of the image forming system according to the present embodiment will be described below as Modified examples 1 to 3.

Modified Example 1

First, Modified example 1 will be described. In the embodiment described above, a setting as to whether or not a corporate color is used is made for frame image data on the image distribution device 100 side, and a color profile to be used is switched based on the setting on the printing device 110 side. Thus, in the embodiment described above, when introducing a function to which the technology according to the present disclosure is applied, it is required to apply a support related to the introduction of the function such as update to both the image distribution device 100 and the printing device 110. In contrast, in the present modified example, an example of a scheme will be described that performs support, which is related to introduction of a function to which the technology according to the present disclosure is applied, on the printing device 110 side and this enables introduction of the function even without requiring to perform a support on the image distribution device 100 side.

First, as for an example of the overall process flow in the image forming system according to the present modified example, a process related to printing when a corporate color is used in a print material will be focused on and described with reference to FIG. 10.

In S1000, in response to an instruction from the user, the printing device 110 registers a color profile used for normal printing and a color profile associated with a corporate color.

In S1001, the image distribution device 100 registers the variable data 410 used for generation of a print image to be distributed to each printing device (for example, the printing device 110).

In S1002, the image distribution device 100 registers the frame image data 400 used for generation of a print image to be distributed to each printing device.

Note that the registration of the variable data in S1001 or the registration of the frame image data 400 in S1002 may be performed in accordance with an instruction from an administrator or the like, for example.

In S1003, the image distribution device 100 sets a combination of the frame image data 400 and the variable data 410 for generating a print image (for example, a print image of a print material used in a shop where the printing device is installed) to be distributed to each printing device.

As set forth, preparation of distribution of print image data is completed on the image distribution device 100 side.

In S1004, the printing device 110 transmits a transmission request for print image data to the image distribution device 100.

In S1005, in response to transmission request for print image data from the printing device 110 in S1004, the image distribution device 100 transmits print image data to generate a print image used for printing in the printing device 110.

In S1006, the printing device 110 sets information indicating whether or not a corporate color is present (in other words, information indicating whether or not a special color setting is required) for the frame image data 400 included in print image data received in S1005. For example, when having recognized that a company logo is included in the frame image data 400 based on an instruction from the user, the printing device 110 may set information indicating that a corporate color is used for this frame image data 400.

In S1007, based on the information that indicates whether or not a corporate color is used and that is set in the frame image data included in the print image data received in S1005, the printing device 110 changes the color profile to use for each page to be printed.

In S1008, the printing device 110 renders a print image based on the combination of the frame image data 400 and the variable data 410 included in the print image data received in S1005.

In S1009, the printing device 110 prints a print image rendered in S1008 on a recording medium such as a sheet.

Next, some processes of a series of processes illustrated in FIG. 10 will be described in more detail.

Figure 11:
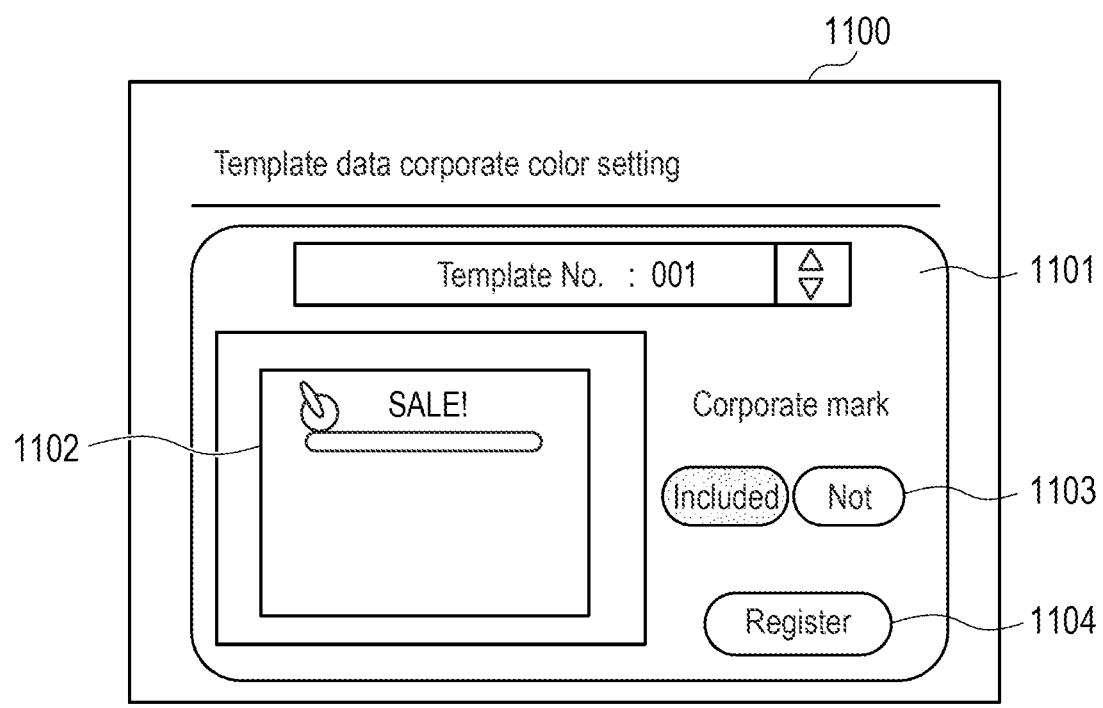
FIG. 11 is a diagram illustrating an example of an operation window of the printing device.

First, an example of a window will be described with reference to FIG. 11. In performing the process of S1006, for the frame image data included in the received print image data, the printing device 110 uses this window to accept designation from the user as to whether or not a corporate color is used. A window 1100 illustrated in FIG. 11 is presented to the user when displayed on the operation unit 305 of the printing device 110.

The printing device 110 accepts an instruction from the user via the window 1100 and thereby sets information indicating whether or not a corporate color is used for each frame image data. The window 1100 includes an entry region 1101, a display region 1102, a switching button 1103, and a registration button 1104.

The entry region 1101 is an entry region for accepting, from the user, designation of frame image data to set information indicating whether or not a corporate color is used. In the example illustrated in FIG. 11, the entry region 1101 is configured as a drop-down list and enables the user to select, out of the list, frame image data to set information indicating whether or not a corporate color is used.

The display region 1102 is a display region in which a preview of an image based on the frame image data designated via the entry region 1101 (for example, a template image) is displayed. For example, the user is able to review the preview image displayed in the display region 1102 and determine whether or not a corporate mark is used in the frame image data designated via the entry region 1101.

The switching button 1103 is a button for accepting designation from the user as to whether or not a corporate mark is present in the image data (in other words, whether or not a corporate color is used) for the frame image data designated via the entry region 1101. For example, the user is able to designate information indicating whether or not a corporate color is used for the frame image data designated via the entry region 1101 by operating the switching button 1103 in accordance with a result of the review of the preview image.

The registration button 1104 is a button for accepting, from the user, an instruction to finally determine the setting of information indicating whether or not a corporate color is used for the frame image data based on the information designated via the window 1100.

Next, as for an example of the process in the printing device 110, the process illustrated as S1004 to S1009 in FIG. 10 in particular will be focused on and described with reference to FIG. 12. In the example illustrated in FIG. 12, as illustrated with reference to FIG. 10, information indicating whether or not a corporate color is used is set for each frame image data on the printing device 110 side, and the operation related to printing is changed in accordance with the setting. Further, a series of processes illustrated in FIG. 12 are implemented when the CPU 301 loads a program stored in the eMMC 302 or the storage device 304 into the DRAM 303 and executes the program, for example.

In S1200, the printing device 110 queries the image distribution device 100 as to whether or not printable print image data is present and presents a result of this inquiry to the user (operator). This enables the user to know whether or not printable print image data is present.

In S1201, the printing device 110 switches the subsequent operation in accordance with whether or not printable print image data is present.

Figure 12:
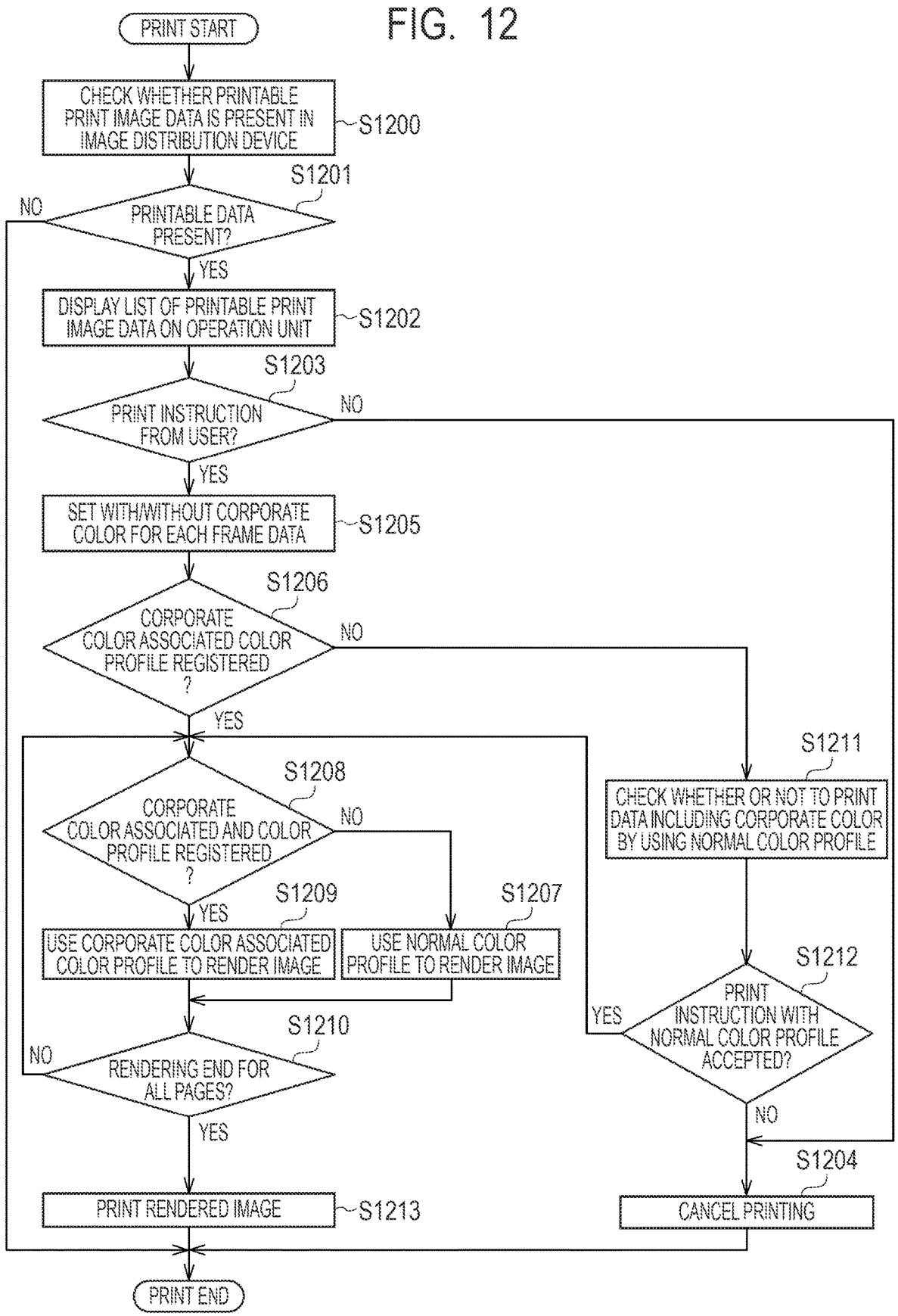
FIG. 12 is a flowchart illustrating an example of a process in the printing device.

If the printing device 110 determines in S1201 that no printable print image data is present, the printing device 110 ends the series of processes illustrated in FIG. 12.

In contrast, if the printing device 110 determines in S1201 that printable print image data is present, the printing device 110 proceeds with the process to S1202.

In S1202, the printing device 110 receives printable print image data from the image distribution device 100 and causes the window 810 displaying a list of print image data (in other words, a list of printable print materials) to be displayed on the operation unit 305.

The printing device 110 then waits for an instruction of printing from the user (operator) in S1203.

If the printing device 110 determines in S1203 that no instruction of printing is accepted from the user (for example, when termination is instructed without an instruction of printing being accepted or the like), the printing device 110 proceeds with the process to S1204. In such a case, the printing device 110 stops the process for printing in S1204 and ends the series of processes illustrated in FIG. 12.

In contrast, if the printing device 110 determines in S1203 that an instruction of printing is accepted from the user, the printing device 110 proceeds with the process to S1205.

In S1205, in response to the instruction from the user via the operation unit 305, the printing device 110 sets information for each frame image as to whether or not a corporate color is used.

For example, the window 1100 illustrated in FIG. 11 is used to accept the instruction.

In S1206, the printing device 110 checks whether or not a color profile associated with a corporate color used in frame image data included in the print image data received in S1202 is registered.

If the printing device 110 determines in S1206 that the color profile associated with the corporate color used in the frame image data is not registered, the printing device 110 proceeds with the process to S1211.

In contrast, if the printing device 110 determines in S1206 that the color profile associated with the corporate color used in the frame image data is registered, the printing device 110 proceeds with the process to S1208.

In S1211, the printing device 110 queries the user as to whether or not to apply the normal color profile to print a print image using the frame image data in which the corporate color is used. As a specific example, the printing device 110 may cause the dialog box 821 illustrated as an example in the description for the window 820 to be displayed on the operation unit 305 and thereby perform the above inquiry to the user via the dialog box 821.

In S1212, the printing device 110 determines whether or not an instruction of printing applying a normal profile has been accepted for the print image using the frame image data in which the corporate color is used.

If the printing device 110 determines in S1212 that the printing applying the normal color profile is not instructed for the print image using the frame image data in which the corporate color is used, the printing device 110 proceeds with the process to S1204. In such a case, the printing device 110 stops the process for printing in S1204 and ends the series of processes illustrated in FIG. 12.

In contrast, if the printing device 110 determines in S1212 that the printing applying the normal color profile is instructed for the print image using the frame image data in which the corporate color is used, the printing device 110 proceeds with the process to S1208.

In S1208, based on the print image data received in S1202, the printing device 110 determines whether or not a corporate color is used in frame image data to be applied for each page to be printed and an associated color profile has been registered.

If the printing device 110 determines in S1208 that a corporate color is used in frame image data to be applied for the targeted page and that an associated color profile has been registered, the printing device 110 proceeds with the process to S1209. In S1209, the printing device 110 uses a color profile associated with a corporate color used in the frame image data to render a print image of a targeted page.

In contrast, If the printing device 110 determines in S1208 that a corporate color is not used in frame image data to be applied for the targeted page or an associated color profile has not been registered, the printing device 110 proceeds with the process to S1207. In S1207, the printing device 110 uses the normal color profile to render a print image of a targeted page.

In S1210, the printing device 110 determines whether or not rendering of print image is completed for all the pages to be printed.

If the printing device 110 determines in S1210 that the rendering of the print image is not completed for all the pages to be printed, the printing device 110 proceeds with the process to S1208. In such a case, the process on and after S1208 is again performed on a page where the rendering of the print image is not completed.

Then, if the printing device 110 then determines in S1210 that the rendering of the print image is completed for all the pages to be printed, the printing device 110 proceeds with the process to S1213. In S1213, the printing device 110 prints the rendered print image on a recording medium such as a sheet. In response to the completion of printing for all the pages to be printed, the printing device 110 then ends the series of processes illustrated in FIG. 12.

As set forth, the image forming system according to Modified example 1 has been described with reference to FIG. 10 to FIG. 12.

Modified Example 2

Next, Modified example 2 will be described. In Modified example 1, the user operating the printing device 110 designates whether or not a corporate color is used for frame image data included in print image data via the operation window illustrated as the window 1100 in FIG. 11 as an example, and thereby a color profile is set. However, there may be a situation where frame image data (for example, a template) used in the past is again used in the subsequent printing.

In view of such circumstances, the present modified example proposes an example of a scheme that can further reduce user effort related to designation as to whether or not a corporate color is used for frame image data.

Specifically, when having accepted designation from the user as to whether or not a corporate color is used for each frame image data via the window 1100, the printing device 110 according to the present modified example stores information in accordance with the designation in association with frame image data to be designated. The printing device 110 then controls a default input state in the entry region 1101 of the window 1100 based on the information stored in the above when the frame image data is again targeted for a print process later.

Specifically, when indication of a corporate color being used has been designated in advance for the targeted frame image data, the printing device 110 sets, as a default state, a state where indication of a corporate color being used has been designated for the entry region 1101.

With application of the control as described above, the user is not required to again perform the operation related to designation as to whether or not a corporate color is used, every time the frame image data used in the past printing is again used in printing. That is, according to the image forming system of the present modified example, an advantageous effect of further reducing user effort at printing can be expected.

As set forth, the image forming system according to Modified example 2 has been described.

Modified Example 3

Next, Modified example 3 will be described. In the embodiments or each modified example described above, when a color profile associated with a corporate color used in frame image data is not registered in a targeted printing device, the process of either continuing the printing or cancelling the printing is applied. However, a situation where a plurality of printing devices are installed in a shop or an office is expected, and under such a situation, even when a targeted color profile is not registered in some of the printing devices, the color profile may be registered in the remaining printing device. Accordingly, the present modified example proposes an example of a scheme that, when a color profile associated with a corporate color used in printing is not registered in a targeted printing device, enables the printing by using another printing device in which the color profile is registered.

First, as a general setting, the image distribution device 100 according to the present modified example manages the registration status of a color profile for each printing device 110.

Figure 10:
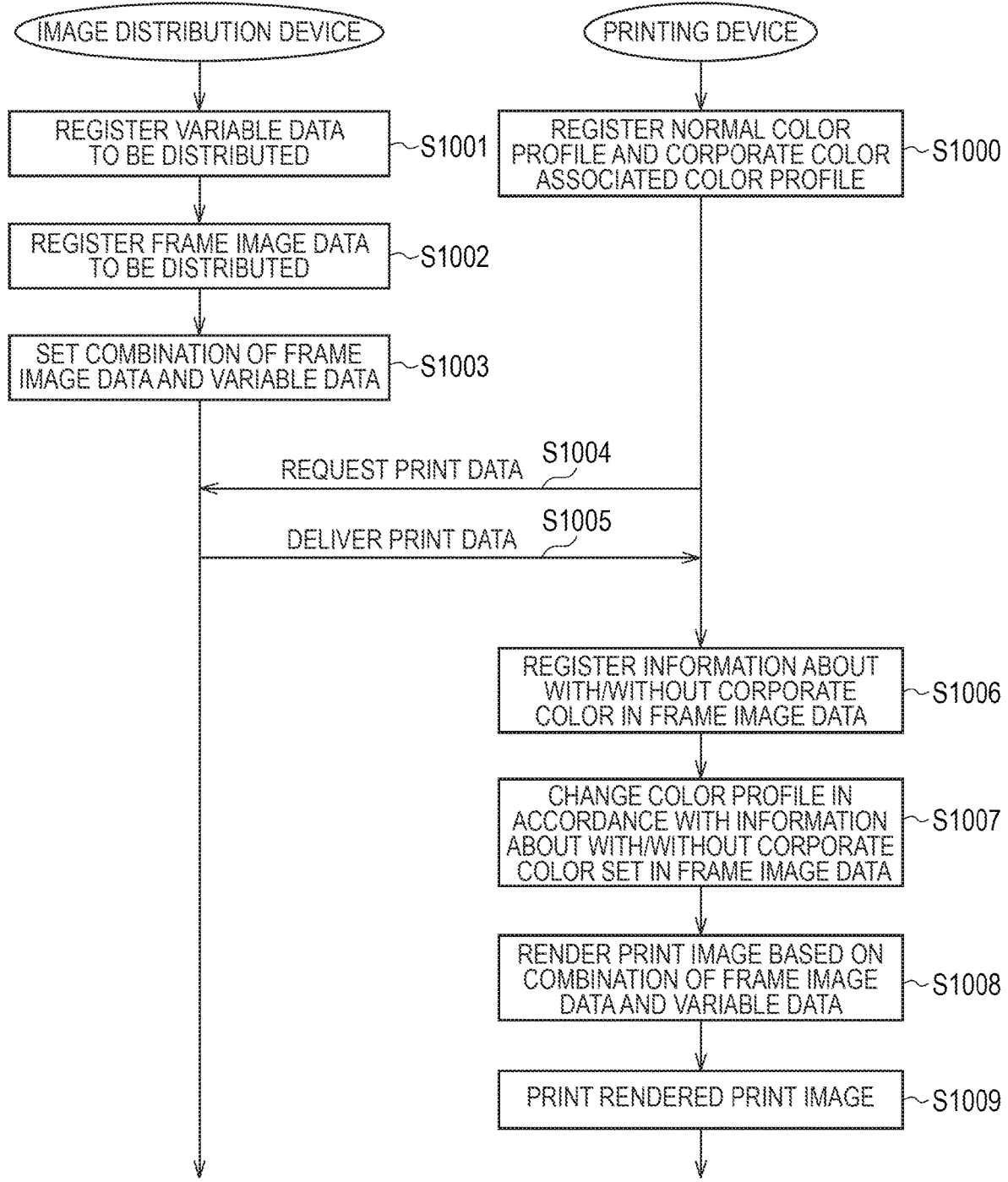
FIG. 10 is a sequence diagram illustrating an example of a process in the image forming system.

As a specific example, when having registered a color profile in the process of S500 of FIG. 5 or the process of S1000 of FIG. 10, the printing device 110 notifies the image distribution device 100 of the registration status of the color profile. This enables the image distribution device 100 to recognize the support status of the color profile for each printing device 110 (in other words, the corporate color that can be printed by each printing device 110).

Further, the image distribution device 100 may manage information about the printing device 110 installed for each management unit such as each shop or each office. As a specific example, when three printing devices 110 are installed in some shop, the image distribution device 100 manages these three printing devices 110 in association with the shop. Accordingly, when it is difficult for the printing device 110 installed in some shop to perform printing, the image distribution device 100 can also transfer print image data performed for the printing to another printing device 110 installed in that shop.

Next, an example of a general process in the image forming system according to the present modified example will be described. When a color profile associated with a corporate color used in frame image data is not registered, the printing device 110 accepts an instruction from the user for the subsequent process. In such a case, as illustrated in the process of S910 of FIG. 9 or the process of S1211 of FIG. 12 as examples in the embodiments described above or Modified example 1, the printing device 110 presents "Apply normal color profile for print" and "Cancel print" as choices that the user may designate.

In contrast, in the present modified example, the printing device 110 presents a choice of "Use alternative machine for print" to the user in addition to the choices of "Apply normal color profile for print" and "Cancel print" illustrated above as an example. Then, when "Use alternative machine for print" is designated, printing using a targeted print image data is performed by, instead of the above printing device 110, another printing device 110 in which the color profile associated with the targeted corporate color is registered. Accordingly, the overview of the process when "Use alternative machine for print" is designated will be described below.

When the color profile associated with the corporate color used in frame image data is not registered, the printing device 110 presents, to the user, a UI where the choices illustrated above as an example are presented and accepts an instruction from the user via the UI. When "Use alternative machine for print" is designated, the printing device 110 requests the image distribution device 100 to transmit information about a printing device in which the color profile is registered. In response to receiving the request from the printing device 110, the image distribution device 100 transmits, back to the printing device 110, information about a further printing device having the above registered color profile and located in the shop where the printing device 110 is installed.

Based on the above information transmitted back from the image distribution device 100, the printing device 110 presents, to the user, a list of printing devices in which the color profile is registered and accepts designation of the further printing device used for printing from the user. The printing device 110 then transmits, to the image distribution device 100, information indicating the further printing device designated by the user and information about a print target (for example, information about a print image using a frame image in which the corporate color is used). As described above, the printing device 110 requests the image distribution device 100 to cause the further printing device designated by the user to perform printing of the above print target.

In response to the request from the printing device 110, the image distribution device 100 transmits print image data associated with the print target designated by the printing device 110 to the further printing device designated by the printing device 110. As set forth, the image distribution device 100 instructs the further printing device to perform printing based on the print image data. This enables the above further printing device to apply the color profile associated with the corporate color used in frame image data included in the print image data and perform the printing based on the print image data.

As described above, according to the image forming system of the present modified example, even under a situation where it is difficult to perform printing using a desired corporate color in some printing device, the user is able to cause another printing device to perform the printing.

As set forth, the image forming system according to Modified example 3 has been described.

According to the present invention, a color profile can be applied in more suitable manner in accordance with a property of a print image to be printed.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-026732 filed Feb. 24, 2022, which is hereby incorporated by reference herein in its entirety.

What is claimed is:

1. An image forming system including an image distribution device and a printing device,
   wherein the image distribution device distributes print image data to an external device via a network, the print image data including first data including an image applied commonly to a plurality of print materials and second data including information changed on a print material basis,
   wherein the printing device combines the first data and the second data included in the print image data to form a print image,
   wherein the first data is configured to enable a setting that a special color setting is required,
   wherein, when the setting indicating that a special color setting is required is made for the first data, the printing device uses a color profile associated with the setting to form the print image based on the first data and the second data, and
   wherein the printing device notifies, when a setting indicating that a special color setting is required is made for the first data included in the print image data and a color profile associated with the setting is not registered in the printing device, a user that the color profile associated with the setting is not registered.

2. The image forming system according to claim 1,
   wherein the image distribution device further attaches, to the first data, color adjustment information indicating that a special color setting is required, and
   wherein when the color adjustment information is attached to the first data, the printing device uses a color profile associated with the color adjustment information to form the print image based on the first data and the second data.

3. The image forming system according to claim 1,
   wherein the printing device further provides, to the first data, a setting indicating that a special color setting is required in response to an instruction from a user, and
   wherein when the setting indicating that a special color setting is required is made for the first data, the printing device uses a color profile associated with the setting to form the print image based on the first data and the second data.

4. The image forming system according to claim 1, wherein the printing device further notifies the user that it is difficult to form a print material with an expected hue by a printing device to which the print image data is distributed.

5. An image forming system including an image distribution device and a printing device,
wherein the image distribution device distributes print image data to an external device via a network, the print image data including first data including an image applied commonly to a plurality of print materials and second data including information changed on a print material basis,
wherein the printing device combines the first data and the second data included in the print image data to form a print image,
wherein the first data is configured to enable a setting that a special color setting is required,
wherein when the setting indicating that a special color setting is required is made for the first data, the printing device uses a color profile associated with the setting to form the print image based on the first data and the second data, and
wherein the printing device accepts, when a setting indicating that a special color setting is required is made for the first data included in the print image data and a color profile associated with the setting is not registered in the printing device, an instruction to cause a further printing device to perform printing based on the print image data from a user, and
wherein the printing device requests, in response to the instruction from the user, the image distribution device to cause the further printing device to perform printing based on the print image data.

6. The image forming system according to claim 5,
wherein the printing device accepts, from the user, any of at least a first instruction related to execution of printing based on the print image data used in the printing device, a second instruction related to cancellation of printing based on the print image data, and a third instruction related to execution of printing based on the print image data using a further printing device that is different from the printing device, and
wherein when the third instruction is accepted, the printing device requests the image distribution device to cause the further printing device designated by the user to perform printing based on the print image data.

7. A printing device comprising:
a printer that forms a print image by combining first data applied commonly to a plurality of print materials and second data including information changed on a print material basis, the first data and the second data being included in print image data,
wherein the first data is configured to enable a setting that a special color setting is required,
wherein when the setting indicating that a special color setting is required is made for the first data, the printer uses a color profile associated with the setting to form the print image based on the first data and the second data, and
wherein the printing device notifies, when a setting indicating that a special color setting is required is made for the first data included in the print image data and a color profile associated with the setting is not registered in the printing device, a user that the color profile associated with the setting is not registered.

8. The printing device according to claim 7,
wherein the printing device further provides, to the first data, a setting indicating that a special color setting is required in response to an instruction from a user, and
wherein when the setting indicating that a special color setting is required is made for the first data, the printing device uses a color profile associated with the setting to form the print image based on the first data and the second data.

9. The printing device according to claim 7, wherein the printing device further notifies the user that it is difficult to form a print material with an expected hue by a printing device to which the print image data is distributed.

10. A control method of an image forming system including an image distribution device and a printing device, the control method comprising:
distributing, from the image distribution device, print image data to an external device via a network, the print image data including first data including an image applied commonly to a plurality of print materials and second data including information changed on a print material basis; and
combining, at the printing device, the first data and the second data included in print image data to form a print image,
wherein the first data is configured to enable a setting that a special color setting is required,
wherein, when the setting indicating that a special color setting is required is made for the first data, the control method further comprises using, in the printing device, a color profile associated with the setting to form the print image based on the first data and the second data, and
wherein, when a setting indicating that a special color setting is required is made for the first data included in the print image data and a color profile associated with the setting is not registered in the printing device, the control method further comprises notifying, from the printing device, a user that the color profile associated with the setting is not registered.

11. A non-transitory computer-readable storage medium storing a computer program for performing a control method of an image forming system including an image distribution device and a printing device, the control method comprising:
distributing, from the image distribution device, print image data to an external device via a network, the print image data including first data including an image applied commonly to a plurality of print materials and second data including information changed on a print material basis; and
combining, at the printing device, the first data and the second data included in print image data to form a print image,
wherein the first data is configured to enable a setting that a special color setting is required,
wherein, when the setting indicating that a special color setting is required is made for the first data, the control method further comprises using, in the printing device, a color profile associated with the setting to form the print image based on the first data and the second data, and
wherein, when a setting indicating that a special color setting is required is made for the first data included in the print image data and a color profile associated with the setting is not registered in the printing device, the control method further comprises notifying, from the printing device, a user that the color profile associated with the setting is not registered.

* * * * *